US009189207B2

(12) United States Patent
Torgemane et al.

(10) Patent No.: US 9,189,207 B2
(45) Date of Patent: Nov. 17, 2015

(54) METHODS AND SYSTEMS FOR DYNAMIC RUNTIME GENERATION OF CUSTOMIZED APPLICATIONS

(71) Applicant: Telefonaktiebolaget L M Ericsson (publ), Stockholm (SE)

(72) Inventors: Henri Torgemane, Cedar Park, TX (US); Benjamin Halsted, San Jose, CA (US); Oliver Unter Ecker, Los Angeles, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/287,904

(22) Filed: May 27, 2014

(65) Prior Publication Data

US 2015/0261506 A1 Sep. 17, 2015

Related U.S. Application Data

(60) Provisional application No. 61/951,514, filed on Mar. 11, 2014.

(51) Int. Cl.
    *G06F 9/44* (2006.01)
(52) U.S. Cl.
    CPC .............. *G06F 8/30* (2013.01); *G06F 9/4443* (2013.01)
(58) Field of Classification Search
    CPC ...... G06F 9/4443; G06F 9/45512; G06F 8/30
    See application file for complete search history.

(56) References Cited

U.S. PATENT DOCUMENTS

| 8,281,287 | B2 * | 10/2012 | Finocchio | 717/140 |
|---|---|---|---|---|
| 8,863,015 | B2 * | 10/2014 | Almonte et al. | 715/767 |
| 9,081,591 | B2 * | 7/2015 | Kinoshita et al. | 1/1 |
| 2002/0049867 | A1 * | 4/2002 | Kumagai | 709/319 |
| 2002/0085033 | A1 * | 7/2002 | Robinson et al. | 345/762 |
| 2003/0107591 | A1 * | 6/2003 | Jameson | 345/744 |

(Continued)

FOREIGN PATENT DOCUMENTS

CN   102693323 A   9/2012

OTHER PUBLICATIONS

Song et al., Rapid GUI development on legacy systems: a runtime model-based solution, Oct. 2012, 6 pages.*

(Continued)

*Primary Examiner* — Thuy Dao
(74) *Attorney, Agent, or Firm* — Nicholson De Vos Webster & Elliott LLP

(57) ABSTRACT

A user equipment (UE) device for programmatic runtime generation of an application. The UE device receives a UI definition file that includes definitions indicating visual appearance attributes of portions of the application, a set of components that are UI building blocks to be presented within the application, and a set of behaviors that may be performed by the components, where the definitions include attribute-value pairs. The UE device receives a set of component definition files that include code for implementing components that includes the components indicated by the UI definition file and after a beginning of an execution of the application, the UE device parses the UI definition file to identify the visual appearance attributes, the set of components, and the set of behaviors; and dynamically instantiates the set of components based upon the parsed UI definition file and the set of component definition files to create the application.

16 Claims, 9 Drawing Sheets

(56) References Cited

U.S. PATENT DOCUMENTS

| | | | |
|---|---|---|---|
| 2003/0160822 A1* | 8/2003 | Belz et al. | 345/762 |
| 2004/0268413 A1 | 12/2004 | Reid et al. | |
| 2006/0041879 A1 | 2/2006 | Bower et al. | |
| 2006/0080382 A1* | 4/2006 | Dutta et al. | 709/203 |
| 2009/0063499 A1* | 3/2009 | Koinuma et al. | 707/10 |
| 2011/0131513 A1* | 6/2011 | Yamamoto | 715/763 |
| 2011/0167363 A1* | 7/2011 | Kinoshita | 715/763 |

OTHER PUBLICATIONS

Popp et al., Tool support for automated multi-device GUI generation from discourse-based communication models, Jun. 2013, 6 pages.*

Specification of the Bluetooth System; Master Table of Contents & Compliance Requirements; Covered Core Package version 4.2; Bluetooth SIG Proprietary; publication date Dec. 2, 2014; 2772pgs.

Bluetooth Smart (Low Energy) Technology; Technology Overview; Bluetooth Development Portal; copyright 2014 Bluetooth SIG, Inc.; https://developer.bluetooth.org/TechnologyOverview/Pages/BLE.aspx; downloaded on Dec. 11, 2014; 2pgs.

IEEE 802.11 Wireless LAN Wi-Fi; IEEE Global History Network; copyright 2013 IEEE; http://www.ieeeghn.org/wiki/index.php/Wireless_LAN_802.11_Wi-Fi#802.11g; downloaded on Dec. 11, 2014; 4pgs.

"About SproutCore", 2 pages, downloaded from http://sproutcore.com/about/ on Dec. 22, 2014.

"Adobe® Dreamweaver® CC Help", Sep. 29, 2014, 678 pages, Abobe.

"Chrome DevTools Overview", 10 pages, downloaded from https://developer.chrome.com/devtools on Dec. 22, 2014.

"Dashcode User Guide", 2012, 102 pages, Apple, Inc.

"Firefox Developer Tools, Debugger", 25 pages, downloaded from https://developer.mozilla.org/en-US/docs/Tools/Debugger on Dec. 22, 2014.

"Frequently Asked Questions", 4 pgaes, Codiqa, downloaded from http://docs.codiqa.com/codiqa/faq/ on Dec. 22, 2014.

"How jQuery Works", 2014, 7 pages, The jQuery Foundation, downloaded from http://learn.jquery.com/about-jquery/how-jquery-works/ on Dec. 22, 2014.

"More Productive Out of the Box", 5 pages, downloaded from http://emberjs.com/about/ on Dec. 22, 2014.

"Safari Web Inspector Guide", 2013, 55 pages, Apple Inc.

"Welcome to Ext JS", Dec. 11, 2014, 3 pages, downloaded from http://docs.sencha.com/extjs/5.1/getting—started/welcome_to_extjs.html on Dec. 22, 2014.

"What is Cappuccino?", 2013, 4 pages, Cappuccino Project, downloaded from http://www.cappuccino-project.org/learn/ on Dec. 22, 2014.

Nadav Greenberg, "css2js 0.1.4", Github, <https://github.com/grnadav/css2js/archive/0.1.4.zip>, Dec. 22, 2013, pp. 1-12.

Wikipedia: "LESS (stylesheet language)", Wikipedia, the free encyclopedia, <http://web.archive.org/web/20140301154742/http://en.wikipedia.org/wiki/LESS_(stylesheet_language)>, Mar. 1, 2014, pp. 1-7.

"Node.js", Wikipedia, the free encyclopedia, <http://web.archive.org/web/20140212103306/http://en.wikipedia.org/wiki/Node.js>, Feb. 12, 2014, pp. 1-7.

Chris Heilmann, "Detecting and generating CSS animations in JavaScript ? Mozilla Hacks", the Web developer blog, <http://web.archive.org/web/20111011043737/https://hacks.mozilla.org/2011/09/detecting-and-generating-css-animations-in-javascript/>, Sep. 5, 2011, pp. 1-4.

Github: "Releases . gmadav/css2js . GitHub", <https://github.com/gmadav/css2js/releases>, May 6, 2015, 1 page.

7sempra: "rosetta/README.md at 4faaff621ebc1b4c546d9b3bd559cb01608e9654 . 7sempra/rosetta", GitHub, <https://github.com/7sempra/rosetta/blob/4faaff621ebc1b4c546d9b3bd559cb01608e9654/README.md>, Nov. 30, 2013, pp. 1-5.

* cited by examiner

200

RECEIVE A USER INTERFACE (UI) DEFINITION FILE GENERATED BY THE OPERATOR, WHEREIN THE UI DEFINITION FILE INCLUDES A PLURALITY OF DEFINITIONS INDICATING VISUAL APPEARANCE ATTRIBUTES OF PORTIONS OF AN APPLICATION, A SET OF COMPONENTS TO APPEAR WITHIN THE APPLICATION, AND A SET OF BEHAVIORS THAT MAY BE PERFORMED BY THE COMPONENTS 205

RECEIVE THE UI DEFINITION FILE FROM A SERVER END STATION ACROSS A NETWORK 210

RECEIVE THE UI DEFINITION FILE AS PART OF THE APPLICATION PACKAGE 215

RECEIVE A SET OF ONE OR MORE COMPONENT DEFINITION FILES THAT INCLUDE CODE FOR IMPLEMENTING A PLURALITY OF COMPONENTS THAT INCLUDES THE SET OF COMPONENTS INDICATED BY THE UI DEFINITION FILE 220

BEGIN LAUNCH OF THE APPLICATION 225

PARSE THE UI DEFINITION FILE TO IDENTIFY THE VISUAL APPEARANCE ATTRIBUTES, THE SET OF COMPONENTS, AND THE SET OF BEHAVIORS 230

REGISTER THE IDENTIFIED SET OF COMPONENTS WITH A COMPONENT FRAMEWORK OF THE APPLICATION AS A REGISTRY 235

DYNAMICALLY INSTANTIATE THE SET OF COMPONENTS BASED UPON THE UI DEFINITION FILE AND THE SET OF COMPONENT DEFINITION FILES 240

DYNAMICALLY GENERATE HTML, CSS, AND JAVASCRIPT OBJECTS REPRESENTING THE SET OF COMPONENTS BASED UPON IDENTIFYING PARAMETERS DEFINED IN THE UI DEFINITION FILE 245

FIG. 2

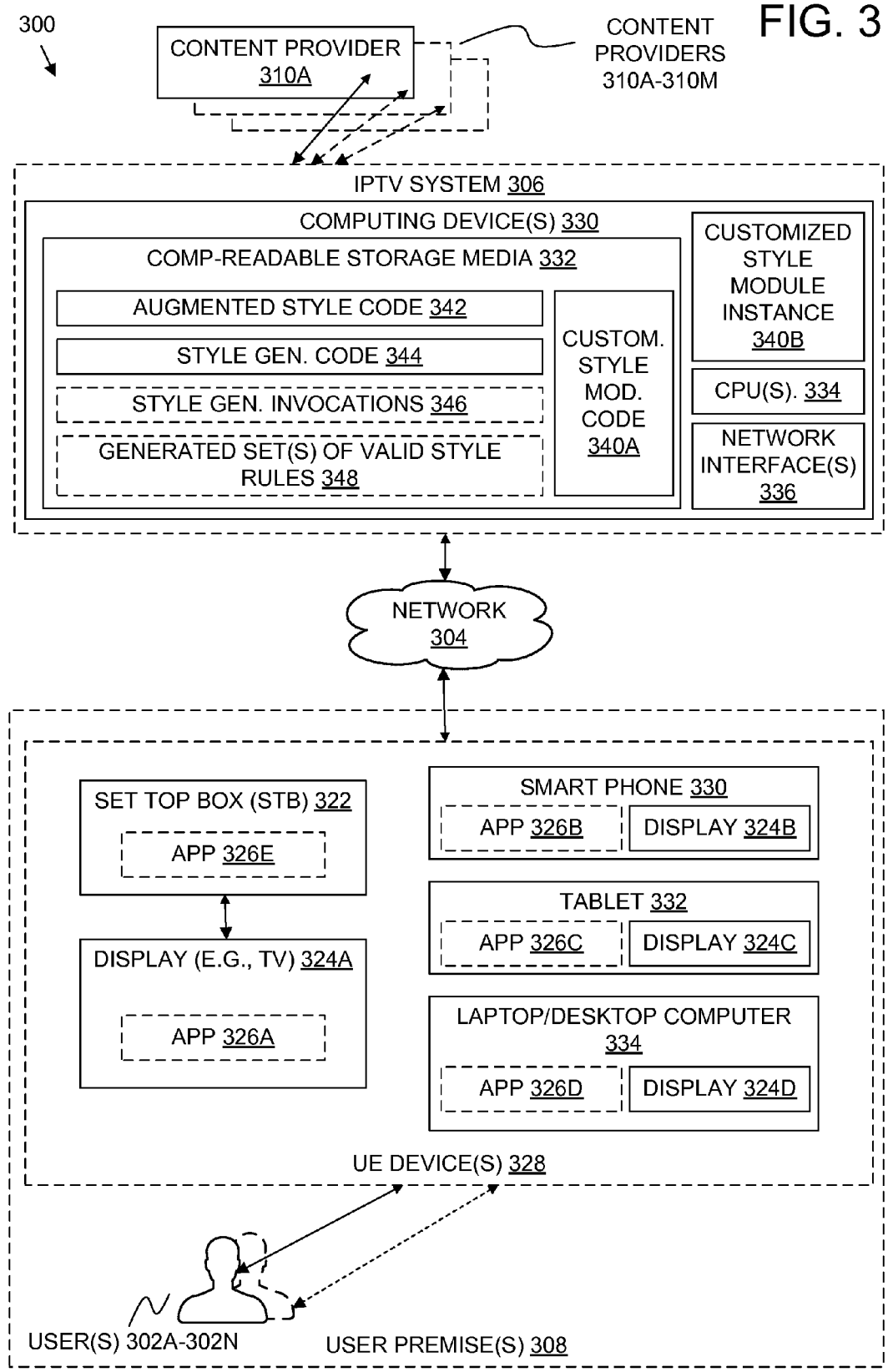

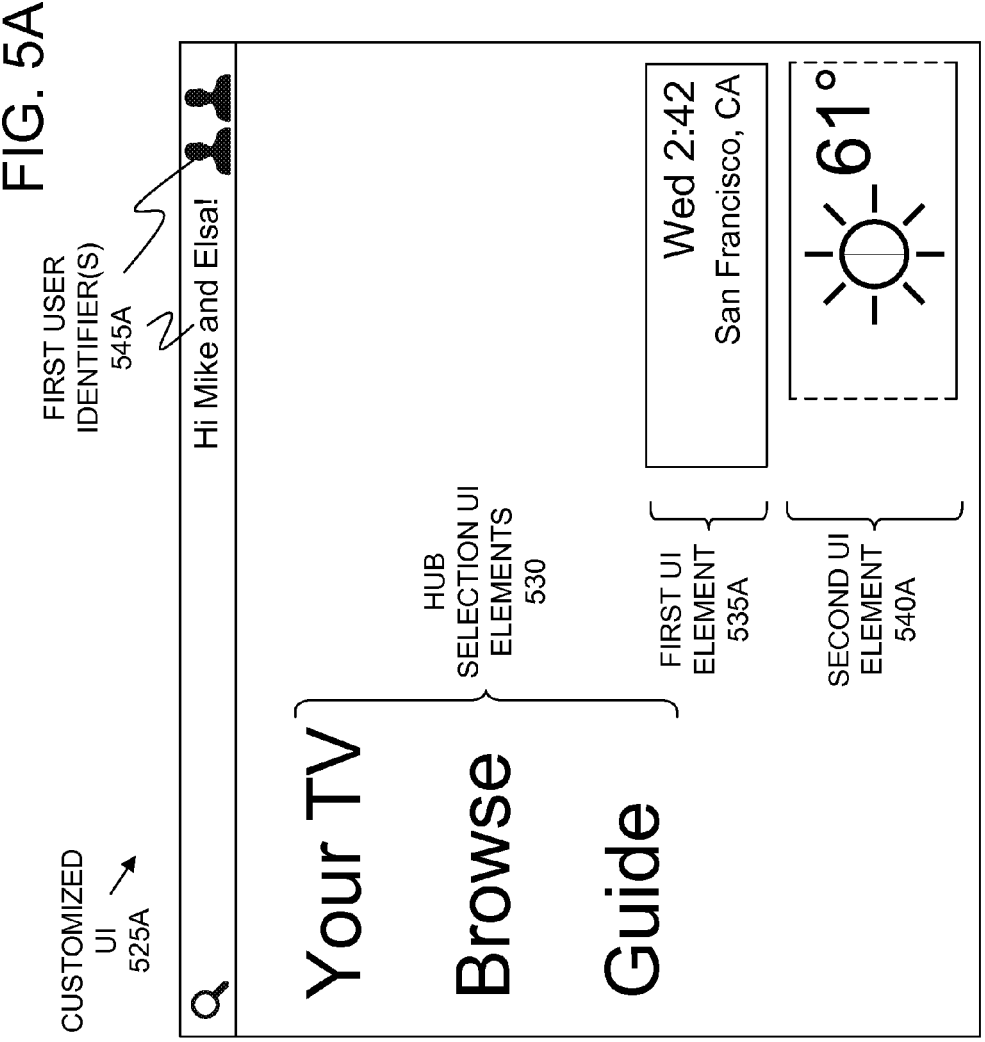
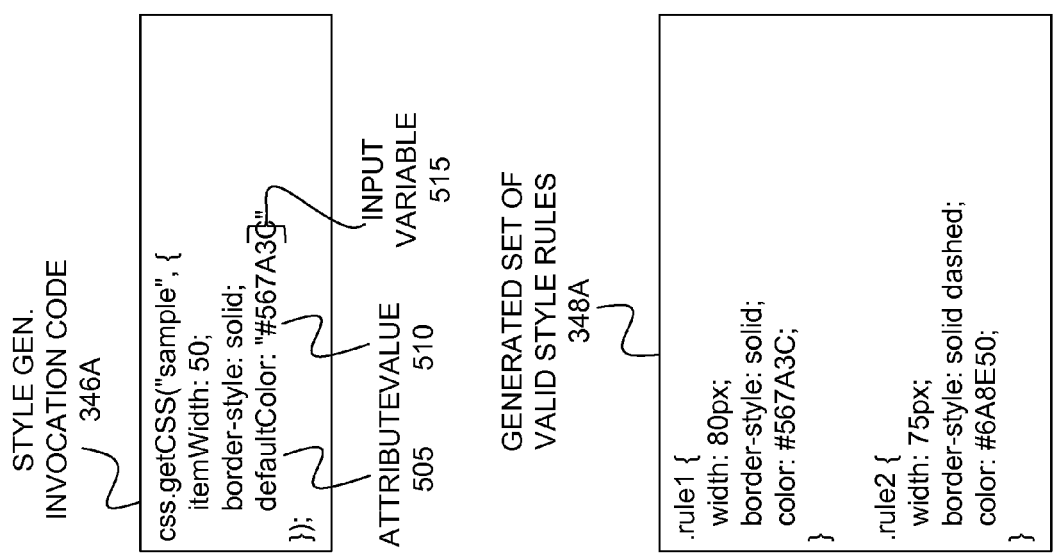

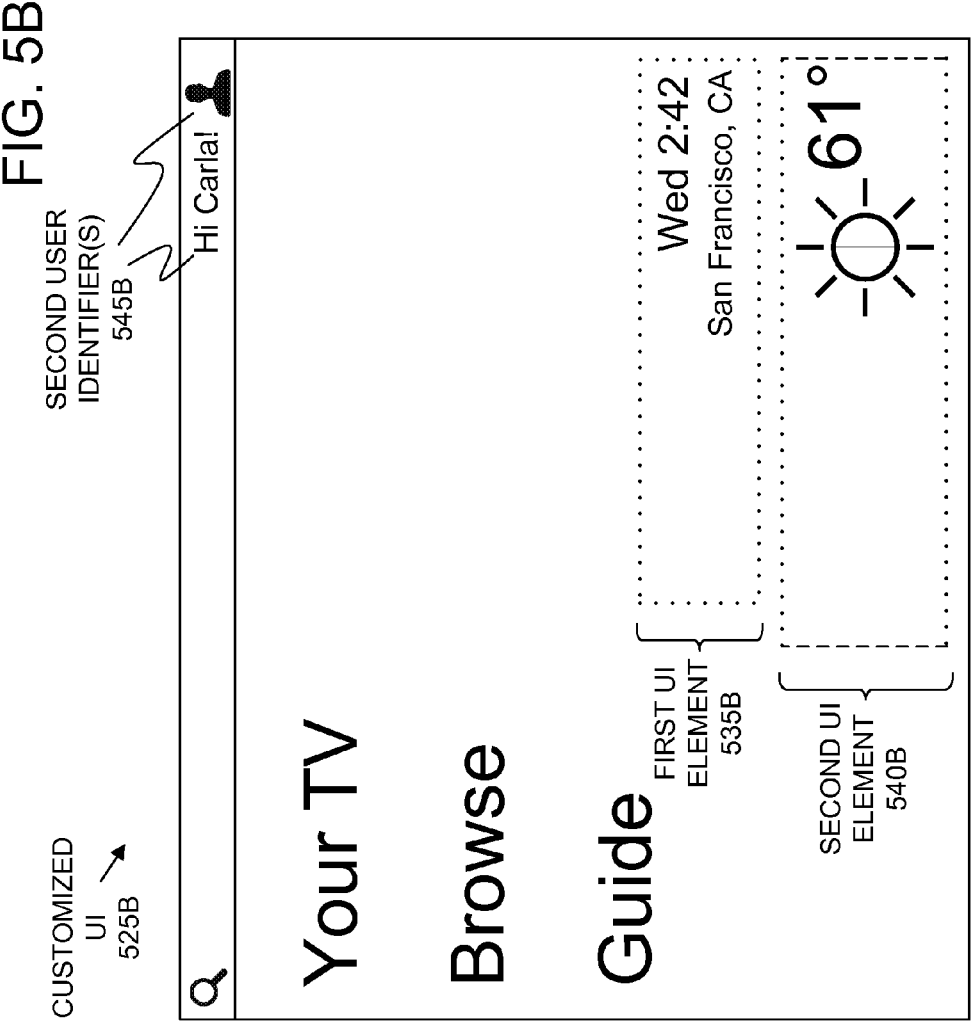

700

```
TRANSFORMING A SET OF ONE OR MORE AUGMENTED STYLE RULES INTO STYLE
GENERATION CODE, WHEREIN THE SET OF AUGMENTED STYLE CODE RULES INCLUDES
BOTH STYLE SYNTAX AND A SET OF ONE OR MORE EXPRESSIONS INCLUDING A SET OF
ONE OR MORE VARIABLES, WHEREIN THE SET OF AUGMENTED STYLE CODE RULES
ARE NOT VALID ACCORDING TO A STYLE STANDARD OF THE STYLE SYNTAX, AND
WHEREIN THE STYLE GENERATION CODE, WHEN EXECUTED BY A SET OF ONE OR
MORE INVOCATIONS USING A SET OF ONE OR MORE INPUT VARIABLES
CORRESPONDING TO THE SET OF VARIABLES, GENERATES A SET OF ONE OR MORE
VALID STYLE RULES ACCORDING TO THE STYLE STANDARD 705
```

TRANSMITTING THE STYLE GENERATION CODE TO A UE DEVICE OF A USER 710

FIG. 7

METHODS AND SYSTEMS FOR DYNAMIC RUNTIME GENERATION OF CUSTOMIZED APPLICATIONS

CROSS-REFERENCE TO RELATED APPLICATIONS

This application claims the benefit of U.S. Provisional Application No. 61/951,514, filed Mar. 11, 2014, which is hereby incorporated by reference.

FIELD

Embodiments of the invention relate to the field of application generation; and more specifically, to dynamic runtime generation of applications through use of parameterized code.

BACKGROUND

IPTV is a multimedia delivery platform that utilizes a packet-based network infrastructure (e.g., broadband Internet access networks) to deliver video content to customers, typically as an alternative to delivery by traditional over-the-air television, satellite television, and cable television. A typical IPTV solution includes head-end video acquisition equipment for receiving television content, intermediate IPTV facilities (e.g., Ericsson Mediaroom™) including server platforms and associated IPTV middleware, networking devices (e.g., routers, switches) for content distribution between various nodes of the IPTV system, access nodes (e.g., very-high-bit-rate digital subscriber line (VDSL or VHDSL) or passive optical network (PON) equipment) to enable high-bandwidth transport to and from the customer premises, and operator-provided applications that manage the IPTV system and/or provide end-user IPTV applications.

Consumers (also referred to as users, end users, viewers, customers, or subscribers) of IPTV services utilize user interfaces of operator-provided applications on User Equipment (UE) devices (such as set-top boxes (STBs), tablets, smartphones, laptops, personal computers, etc.) to access IPTV content. However, these applications are difficult to create, as they are often tremendously complex systems including many layers of abstraction and rely upon customized code bases. Further, it is also desired, by operators, to provide custom application user interfaces (UIs) for different users or devices, and it has proven tremendously difficult to both generate and maintain such custom UIs.

The appearance and behavior of UIs for web applications are typically pre-defined. The code that defines it—CSS, for the most part—is fixed past compile-time and typically statically referenced by a web application.

Although some applications may permit "skinning" for the purposes of app customization, many applications (e.g., those of large companies) require a great deal of customization far beyond what "skinning" can provide, as there is a need to be able to control how user interface elements should look and/or behave—perhaps radically differently. To satisfy such requirements, some application developers have turned to digging into code bases and (statically) applying such customizations. This usually requires expert knowledge of the code base, and can lead to many unintended bugs being created. Accordingly, there is a need for a solution for modifying complex web applications that allows creating widely differing UI experiences, depending on developer preference, without requiring code base changes.

Cascading Style Sheet (CSS) pre-processors have been one approach recently used to more easily build rich web technology based applications that can be customized. However, CSS pre-processors are typically designed to be run as part of a build step to produce static CSS files that can then be used directly by browsers without additional customization. Additionally, some CSS pre-processors perform all parsing, transforming, and variable replacement in one computationally expensive step on the client side, thereby degrading the performance and user experience. Accordingly, there is still a need for generating and maintaining per-user (or per-device) style customization of web application, at a significantly smaller footprint such that it could be suitable for highly customized CSS that can be generated on-demand by web servers or by web browsers.

SUMMARY

In an embodiment of the invention, a method in a server end station for efficiently providing customized user interfaces for an application is disclosed. The method includes transforming a set of one or more augmented style rules into style generation code. The set of augmented style code rules includes both style syntax and a set of one or more expressions that include a set of one or more variables. The set of augmented style code rules are not valid according to a style standard of the style syntax, and the style generation code, when executed by a set of one or more invocations using a set of one or more input variables corresponding to the set of variables, generates a set of one or more valid style rules according to the style standard. The method further includes transmitting the style generation code to a user equipment (UE) device of a user. In some embodiments, the style generation code comprises JavaScript code that is executed by the set of invocations using the input variables as parameters. In some embodiments, the style standard is the Cascading Style Sheets (CSS) standard, and in some embodiments the style generation code and/or the set of invocations comprises JavaScript code. In some embodiments, the executing of the style generation code occurs as part of a build step that includes generating multiple sets of valid style rules to match a same number of known sets of input variables. In some of these embodiments including the build step, the method further includes storing, using a computer-readable medium, the multiple sets of valid style rules, and transmitting the multiple sets of style rules to a plurality of UE devices of a plurality of users.

According to an embodiment of the invention, a non-transitory computer readable storage medium is described. The non-transitory computer readable storage medium stores instructions that, when executed by a set of one or more processors of a computing device, cause the computing device to efficiently provide customized user interfaces for an application by performing a set of operations. The set of operations includes transforming a set of one or more augmented style rules into style generation code. The set of augmented style code rules includes both style syntax and a set of one or more expressions that include a set of one or more variables. The set of augmented style code rules are not valid according to a style standard of the style syntax, and the style generation code, when executed by a set of one or more invocations using a set of one or more input variables corresponding to the set of variables, generates a set of one or more valid style rules according to the style standard. The set of operations further includes transmitting the style generation code to a UE device of a user. In some embodiments, the style standard is the Cascading Style Sheets (CSS) standard, and in some embodiments the style generation code and/or the set of invocations comprises JavaScript code. In some embodiments, the executing of the style generation code occurs on demand. In some embodiments, the executing of the style generation code occurs as part of a build step that includes generating multiple sets of valid style rules to match a same number of known sets of input variables. In some of these embodiments including the build step, the set of operations further includes storing, using the non-transitory computer-readable storage medium or another non-transitory computer-readable storage medium, the multiple sets of valid style rules, and also transmitting the multiple sets of style rules to a plurality of UE devices of a plurality of users.

In an embodiment of the invention, a method in a server end station for efficiently providing customized user interfaces for an application is disclosed. The method includes transforming a set of one or more augmented style rules into style generation code. The set of augmented style code rules includes both style syntax and a set of one or more expressions that include a set of one or more variables. The set of augmented style code rules are not valid according to a style standard of the style syntax, and the style generation code, when executed by a set of one or more invocations using a set of one or more input variables corresponding to the set of variables, generates a set of one or more valid style rules according to the style standard. The method further includes executing the style generation code using the set of input variables to generate the set of valid style rules. In some embodiments, the style generation code comprises JavaScript code that is executed by the set of invocations using the input variables as parameters. The method further includes transmitting the set of valid style rules to a user equipment (UE) device of a user, which causes a customized user interface to be presented to the user. In some embodiments, the method further includes, by the server end station, executing the style generation code with another set of one or more input variables to generate another set of one or more valid style rules, and then transmitting the another set of valid style rules to another UE device of another user, which causes another customized user interface to be presented to the another user that is different than the customized user interface presented to the user. In some embodiments, the style standard is the Cascading Style Sheets (CSS) standard, and in some embodiments the style generation code and/or the set of invocations comprises JavaScript code. In some embodiments, the executing of the style generation code occurs on demand in response to receiving, from the UE device, a request for the set of valid style rules. In some embodiments, the executing of the style generation code occurs as part of a build step that includes generating multiple sets of valid style rules to match a same number of known sets of input variables. In some of these embodiments including the build step, the method further includes storing, using a computer-readable medium, the multiple sets of valid style rules, and transmitting the multiple sets of style rules to a plurality of UE devices of a plurality of users.

According to an embodiment of the invention, a non-transitory computer readable storage medium is described. The non-transitory computer readable storage medium stores instructions that, when executed by a set of one or more processors of a computing device, cause the computing device to efficiently provide customized user interfaces for an application by performing a set of operations. The set of operations includes transforming a set of one or more augmented style rules into style generation code. The set of augmented style code rules includes both style syntax and a set of one or more expressions that include a set of one or more variables. The set of augmented style code rules are not valid according to a style standard of the style syntax, and the style generation code, when executed by a set of one or more invocations using a set of one or more input variables corresponding to the set of variables, generates a set of one or more valid style rules according to the style standard. The set of operations further includes executing the style generation code using the set of input variables to generate the set of valid style rules. In some embodiments, the style generation code comprises JavaScript code that is executed by the set of invocations using the input variables as parameters. The set of operations further includes transmitting the set of valid style rules to a user equipment (UE) device of a user, which causes a customized user interface to be presented to the user. In some embodiments, the set of operations further includes, by the server end station, executing the style generation code with another set of one or more input variables to generate another set of one or more valid style rules, and then transmitting the another set of valid style rules to another UE device of another user, which causes another customized user interface to be presented to the another user that is different than the customized user interface presented to the user. In some embodiments, the style standard is the Cascading Style Sheets (CSS) standard, and in some embodiments the style generation code and/or the set of invocations comprises JavaScript code. In some embodiments, the executing of the style generation code occurs on demand in response to receiving, from the UE device, a request for the set of valid style rules. In some embodiments, the executing of the style generation code occurs as part of a build step that includes generating multiple sets of valid style rules to match a same number of known sets of input variables. In some of these embodiments including the build step, the set of operations further includes storing, using the non-transitory computer-readable storage medium or another non-transitory computer-readable storage medium, the multiple sets of valid style rules, and also transmitting the multiple sets of style rules to a plurality of UE devices of a plurality of users.

According to an embodiment of the invention, a method in a user equipment (UE) device for generating a customized user interface for an application is described. The method includes receiving, at a set of network interfaces of the UE device from a server end station, style generation code. The style generation code, when executed by a set of one or more invocations using a set of one or more input variables corresponding to the set of variables, generates a set of one or more valid style rules of a style standard, and dynamically injects the valid style rules into the application. The method also includes causing the customized user interface to be presented to the user as a result of executing the style generation code according to the set of invocations. The user interface includes a set of one or more user interface elements that are styled according to the set of valid style rules. In some embodiments, the method further includes receiving, from the server end station, the set of invocations using the set of input variables. In some embodiments, the style standard is the Cascading Style Sheets (CSS) standard, and in some embodiments the style generation code and/or the set of invocations comprises JavaScript code.

According to an embodiment of the invention, a non-transitory computer readable storage medium is described. The non-transitory computer readable storage medium stores instructions that, when executed by a set of one or more processors of a computing device, cause the computing device to generate a customized user interface for an application by performing a set of operations. The set of operations includes receiving, at a set of network interfaces of the computing device from a server end station, style generation code. The style generation code, when executed by a set of one or more invocations using a set of one or more input variables corresponding to the set of variables, generates a set of one or more valid style rules of a style standard, and dynamically injects the valid style rules into the application. The set of operations also includes causing the customized user interface to be presented to the user as a result of executing the style generation code according to the set of invocations. The user interface includes a set of one or more user interface elements that are styled according to the set of valid style rules. In some embodiments, the set of operations further includes receiving, from the server end station, the set of invocations using the set of input variables. In some embodiments, the style standard is the Cascading Style Sheets (CSS) standard, and in some embodiments the style generation code and/or the set of invocations comprises JavaScript code.

According to an embodiment of the invention, a method in a user equipment (UE) device for programmatic runtime application creation is described. The method includes receiving a single user interface (UI) definition file. The UI definition file includes a plurality of definitions indicating visual appearance attributes of portions of the application, a set of one or more components to be presented within the application, and a set of behaviors that may be performed by the components. The plurality of definitions includes a plurality of attribute-value pairs. The method further includes receiving a set of one or more component definition files that include code for implementing a plurality of components that includes the set of components indicated by the UI definition file. The method further includes, after a beginning of an execution of the application, parsing the UI definition file to identify the visual appearance attributes, the set of components, and the set of behaviors. The method further includes dynamically instantiating the set of components based upon the parsed UI definition file and the set of component definition files to create the application.

According to an embodiment of the invention, a non-transitory computer readable storage medium is described. The non-transitory computer readable storage medium stores instructions that, when executed by a set of one or more processors of a computing device, cause the computing device to programmatically generate an application at runtime by performing a set of operations. The set of operations includes receiving a single user interface (UI) definition file. The UI definition file includes a plurality of definitions indicating visual appearance attributes of portions of the application, a set of one or more components to be presented within the application, and a set of behaviors that may be performed by the components. The plurality of definitions includes a plurality of attribute-value pairs. The set of operations also includes receiving a set of one or more component definition files that include code for implementing a plurality of components that includes the set of components indicated by the UI definition file. The set of operations further includes, after a beginning of an execution of the application, parsing the UI definition file to identify the visual appearance attributes, the set of components, and the set of behaviors. The set of operations further includes dynamically instantiating the set of components based upon the parsed UI definition file and the set of component definition files to create the application.

Accordingly, embodiments of the invention enable dynamic, runtime generation of user interfaces for web applications. Such embodiments provide application developers the ability to easily build, test, and deploy web custom applications including customized visual appearance, customized components/structures, and customized behavior. In some embodiments, application developers can construct customized applications by modifying expressive, human-readable definitions within a single UI definition file. This UI definition file may flexibly be used by UE devices to, at runtime, dynamically generate the application, or may be executed by a server end station to generate ready-to-use application code for UE devices. Embodiments of the invention allow application developers to create, maintain, and modify these customized applications by relying upon a shared set of component definitions to simply and easily modify the appearance and functionality of the application. Further, in embodiments of the invention the UI definition file abstracts away the presentation and logic code (e.g., HyperText Markup Language (HTML) code, Cascading Style Sheet (CSS) rules, JavaScript code), allowing application developers to instead focus upon generating the application itself instead of the code and concepts (e.g., the Document Object Model (DOM)) behind the application. Embodiments of the invention provide these benefits using parameterized style rules that can be easily finalized into standard CSS rules for multiple environments and/or users using powerful and expressive invocations. In some embodiments, the generation of the finalized standard CSS rules may be flexibly performed, based upon the particular needs of the system, by either a centralized server or by the UE device rendering the application for a user. In some embodiments, the methods, apparatuses, and systems described herein can be used to generate a variety of web technology based applications, such as applications used by users of IPTV systems.

BRIEF DESCRIPTION OF THE DRAWINGS

The invention may best be understood by referring to the following description and accompanying drawings that are used to illustrate embodiments of the invention. In the drawings:

FIG. 2 illustrates a flow in a user equipment device for dynamically generating an application at runtime based upon a UI definition file according to embodiments of the invention;

FIG. 3 illustrates a block diagram of a system including an IPTV system utilizing dynamic runtime application generation based upon style rule parameterization according to an embodiment of the invention;

FIG. 5A illustrates style generation invocation code that, when used to invoke the style generation code of FIG. 4, results in the illustrated set of valid style rules and the customized user interface being generated according to an embodiment of the invention;

FIG. 5B illustrates additional style generation invocation code that, when used to invoke the style generation code of FIG. 4, results in the illustrated additional set of valid style rules and the additional customized user interface being generated according to an embodiment of the invention;

FIG. 7 illustrates a flow in a server end station for utilizing parameterized style rules to allow for the dynamic runtime generation of user interfaces of an application according to some embodiments of the invention.

DESCRIPTION OF EMBODIMENTS

Figure 1:
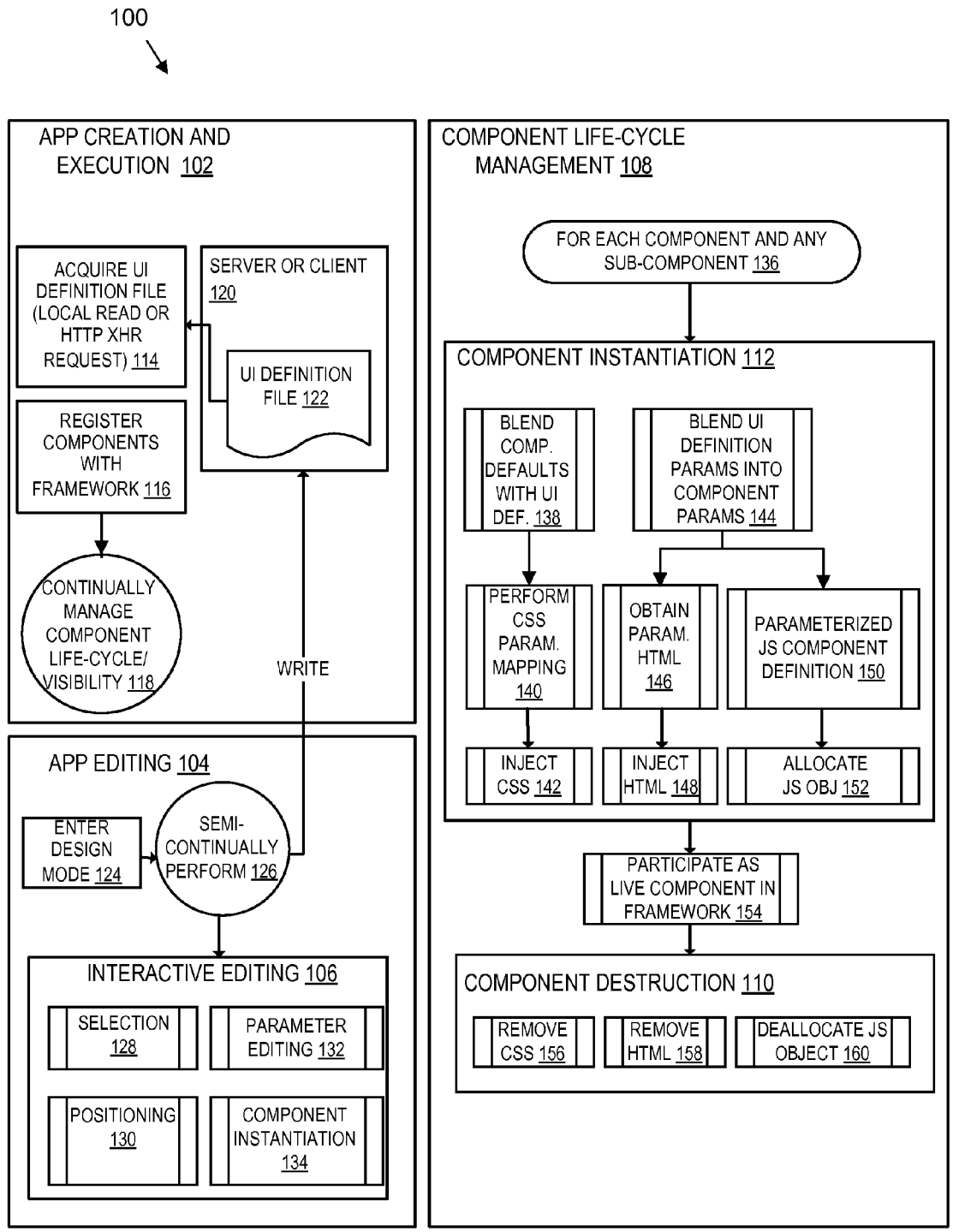
FIG. 1 illustrates stages in a system for dynamic runtime generation of user interfaces of an application according to embodiments of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Methods, apparatuses, and systems for dynamic runtime generation of customized user interfaces and applications are described herein. Embodiments of the invention introduce a framework for easily defining and constructing user interfaces of an application without requiring expert knowledge of the underlying code of the application. In embodiments of the invention, an application developer (e.g., an IPTV operator) can construct customized applications by modifying expressive, human-readable definitions within a single UI definition file. This UI definition file may flexibly be used by UE devices to, at runtime, dynamically generate the application, or used by a server end station to construct ready-to-use application code (e.g., HTML, CSS, and/or JavaScript code). Application developers may quickly and easily construct variants of the application by also constructing alternative UI definition files including different definitions that will cause differing appearances, structures, and behaviors of the subsequently generated applications. For example, different UI definition files may be generated for different types of access that various users are permitted access to (e.g., some users are allowed access to a certain type of content, and thus the UI definition file will include definitions for custom UI elements for accessing that content), for different types of UE devices (e.g., for larger or smaller displays), for different types of operating systems or supporting applications used by the users, etc.

In an embodiment, the UI definition files are used along with a set of component definition files that provide definitions of components that can be instantiated at runtime. Each of the definitions of components may include a set of default visual styles and/or behaviors, which can be overridden/changed through the definitions in the respective UI definition file.

In some embodiments, the system may be configured for a UE device to access a UI definition file along with the set of component definition files to dynamically generate the application at runtime. In some embodiments, this dynamic generation includes dynamically injecting HTML elements, CSS rules, and/or JavaScript code into a web-based display of the application.

In some embodiments, the system may be configured for a server end station to access a UI definition file along with the set of component definition files to generate an application. In an embodiment, this generation includes generating the HTML, CSS, and/or JavaScript necessary for the application to execute at the UE device of a user. In another embodiment, this generation includes creating, based upon the UI definition file and the set of component definition files, style generation code. The style generation code, when executed by a set of invocations using a set of one or more input variables, generates a set of valid style rules of a style standard and dynamically injects the valid style rules into the application.

Thus, embodiments of the invention allow application developers to create, maintain, and modify customized applications by relying upon a shared set of component definitions to simply and easily modify the appearance and functionality of an application. Further, in embodiments of the invention the UI definition file abstracts away the presentation and logic code (e.g., HyperText Markup Language (HTML) code, Cascading Style Sheet (CSS) rules, JavaScript code), allowing application developers to instead focus upon generating the application itself instead of the code and concepts (e.g., the Document Object Model (DOM)) behind the application. Some embodiments of the invention provide these benefits using parameterized style rules that can be easily finalized into standard CSS rules for multiple environments and/or users through use powerful and expressive invocations. In some embodiments, the generation of the finalized standard CSS rules may be flexibly performed, based upon the particular needs of the system, by either a centralized server or by the UE device rendering the application for a user.

In some embodiments, the methods, apparatuses, and systems described herein can be used to generate a variety of web technology based applications, such as applications used by users of IPTV systems. In some IPTV systems, the application code that a user interacts with (e.g., the application executing on a STB, tablet, smartphone, personal computer, etc.) in order to access IPTV content. These applications, through typically originally created by an IPTV technology provider, are often heavily customized by IPTV operators. Using embodiments of the invention, an IPTV operator need only interact with one or more UI definition files to generate one or more customized applications for its users.

FIG. 1 illustrates stages in a system 100 for dynamic runtime generation of an application at runtime under control of a definition file according to embodiments of the invention. The system 100 includes three separate, but interrelated, stages: an application creation and execution 102 stage, an application editing 104 stage, and a component life-cycle management 108 stage.

The application editing 104 stage is performed by an operator/application developer, who may utilize a text or graphical based interface to enter "design mode" 124 to create or update a UI definition file. In an embodiment, this involves launching another UI definition editor webpage displaying a sample UI definition file, which can be edited. The operator may then begin editing as a semi-continuous process 126, in which interactive editing 106 occurs where the results/effect of an edit may be represented to the operator. This interactive editing 106 may include one or more of component selection 128 (e.g., selecting those components to be included in the customized version of the application), positioning 130 (e.g., defining where on the UI the component is to be placed), parameter editing (e.g., changing or setting a value for the application that affects its display or use, such as a color, size, text, etc.), and/or component instantiation 134 (e.g., loading a defined component for the operator to observe and/or interact with the currently-defined version of a component). As or after the UI definition file is modified, it will be saved to a server end station or a UE device 120. A UE device is an electronic device used by a user to access video assets via an application providing access to a media system such as an IPTV system. The UE device may be a Set Top Box (STB), smart phone, tablet, laptop or desktop computer, wearable computing device, etc.

The application creation and execution 102 stage includes an acquisition 114 of a UI definition file 122, from a server end station or the client (i.e., UE device) 120 itself. In embodiments of the invention, the UI definition file includes instructions of a Webapp Definition Language ("WADL"). WADL is a language that permits the description of web application component assemblies, their connections (e.g., behaviors and interactions), and customizer-specific parameter sets for automated web application generation. In an embodiment, WADL serves as the "external definition" part of a larger system for programmatic web application creation. In an embodiment, WADL is aliased on JSON, and thus is easily transported as an XMLHttpRequest (XHR) payload, easily machine-written and machine-read, and human-writable and human-readable. WADL's use of type definitions further permits internal consistency checks and an efficient mapping to internal, computable types. Further, WADL's use of variables permits shared references to one definition, and added comfort for humans writing definitions, and JavaScript pass-throughs permit a large degree of expressiveness at minimal "expense" (to the implementer or learner of the language).

The UI definition file may include many sections detailing components to be included in the application (i.e., the structure of the web application), the appearance of the application, and the behavior of the components within the application. In an embodiment, the UI definition file also includes one or more of a version identifier, a set of "application-wide" default attribute values, and a set of component declarations. A portion of an example UI definition file is provided below as Table A:

TABLE A

Example UI Definition File

```
{
  "version": "0.8",
  "defaults": {
    "container": {
      "backgroundColor": "$dark_backgroundColor"
    },
    "actionButtons": {
      "button": {
        "type": "Size",
        "width": "70px",
        "height": "60px"
      },
      "button_backgroundColor": "$brand_color",
      "in_animation": "none",
      "out_animation": "none"
    }
  },
  "theme": {
    "dark_backgroundColor": "#111111",
    "brand_color": "rgba(100, 50, 30, 0.7)",
    "content_minSize": {
      "type": "Size",
      "width": 1024,
      "height": 786
    },
    "body_font": "\"Segoe UI\", sans-serif"
  },
  "components": [
    {
      "class": "views.Details",
      "root": ".details",
      "components": [
        {
          "class": "actionButtons",
          "layout": {
            "type": "horizontal",
            "contains": "actionButton",
            "controls": "actionBar"
          }
        }
      ]
    },
    {
      "class": "views.YourStuff",
      "type": "container",
      "params": {
        "feeds": [subscriber:Continue, subscriber:Pins, subscriber:Rentals],
        "resetToFirstTabAndItemOnReEnter": true
      },
      "components": [
        {
          "class": "views.DetailsPane",
```

TABLE A-continued

Example UI Definition File

```
        "type": "details_pane",
        "root": "#detailsPanel",
        "params": {
          "metadataPos": {
            "type": "Position",
            "top": "72px",
            "right": "140px"
          }
        }
      },
      {
        "class": "actionButtons",
        "root": "#actionButtons>.actions",
        "params": {
          "barPos": {
            "type": "Position",
            "top": "60px",
            "right": "10px"
          },
          "button": {
            "type": "Size",
            "width": "100px",
            "height": "72px"
          },
          "button spacing": "4px",
          "in_animation": "slideInFromRight 0.5s both 0.25s",
          "out_animation": "slideOutToRight 0.5s both"
        },
        "layout": {
          "type": "vertical",
          "contains": "actionButton",
          "controls": "actionBar"
        }
      },
      {
        "class": "views.Filmstrip",
        "params": {
          "item_gap": "4px",
          "backgroundColor": "rgba(0,0,0,0.40)"
        }
      }
    ]
  }
]
}
```

Turning back to FIG. 1, the application creation and execution 102 stage, in addition to using the UI definition file 122, also includes parsing the UI definition file to identify the needed components, and registering these components with a framework 116. At this point, the component life-cycle management 108 stage is 118 begun.

For each component and every sub-component that may be defined by the UI definition file 136, the component life-cycle management stage 108 stage includes a component instantiation sub-stage 112 that may begin, in an embodiment, as the application begins to launch (e.g., when a browser first loads a page of the application). In this component instantiation sub-stage 112, the default attribute values (as provided by the defined component definition files, which may also include code—HTML and/or JavaScript—to provide the component functionality) will be reconciled (or, "blended") with the defined attribute values from the UI definition file based upon a set of rules. In some embodiments, the component-specific attribute values of the UI definition file will take precedence over conflicting attribute values of the "defaults" portion of the UI definition file, and attribute values of the "defaults" portion of the UI definition file will take precedence over conflicting attribute values set by the component definition files; however, other precedence rules may be defined depending upon the desires of the particular configuration instance.

With the determined "blended" component defaults determined, the component instantiation sub-stage 112 next performs CSS parameter mapping 140 to apply the style rules to the components to be placed in the page without creating conflicts. Next, the style rules (e.g., CSS) are injected into the page. CSS parameter mapping will be described in greater detail later herein.

The component instantiation sub-stage 112 also includes blending 144 the UI definition parameters (e.g., related to component behavior) into the default component parameters. This may also occur according to a precedence rule; in an embodiment, the UI definition parameters take precedence over default component parameters from the component definition files.

Next, the necessary parameterized display code (e.g., HTML) for the necessary components is obtained 146 (based upon code from the component definition files) and the necessary HTML is injected into the application. Similarly, the parameterized script code component definition 150 is gathered and all necessary script code (e.g., JavaScript) to support the components and the UI is allocated 152. Thus, each generated component participates as a live component in the framework 154.

The component life-cycle management stage 108 stage may also include, in an embodiment, a component destruction sub-stage 110 that works to eliminate application components as necessary. For example, if a behavior of one component is to remove another component, that another component may be removed by removing any component-specific style rules (e.g., CSS) 156 from active use, removing 158 any display code (e.g., HTML) of the component from active use, and removing 160 any script code (e.g., JavaScript) objects created for the component.

FIG. 2 illustrates a flow 200 in a user equipment device for dynamically generating an application at runtime based upon a UI definition file according to embodiments of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

The flow 200 includes, at block 205, receive a user interface (UI) definition file generated by the operator. The UI definition file includes a plurality of definitions indicating visual appearance attributes of portions of an application, a set of components to appear within the application, and a set of behaviors that may be performed by the components. Optionally, this receiving of the UI definition file occurs at block 210 from a server end station across a network 210, and optionally this receiving of the UI definition file occurs as part of the application package at block 215.

In some embodiments, the operator generates the UI definition file through a simple text-based interface, a drag-and-drop interface (for adding components into a UI), or a combination of the two.

The flow 200 also includes, at block 220, receiving a set of one or more component definition files that include code for implementing a plurality of components. The plurality of components includes the set of components indicated by the UI definition file (i.e., all of the set of components, and possibly additional components, have definitions in the set of component definition files).

After a beginning launch of the application, at block 225, the UI definition file is read/parsed to identify the visual appearance attributes, the set of components, and the set of behaviors at block 230. Optionally, the parsing at block 230 includes registering the identified set of components with a component framework of the application as a registry, at block 235.

The flow 200 also includes, at block 240, dynamically instantiating the set of components based upon the UI definition file and the set of component definition files. In an embodiment, this includes, at block 245, dynamically generating HTML, CSS, and JavaScript objects representing the set of components based upon identifying parameters defined in the UI definition file.

In an embodiment, this dynamic instantiation is performed by a UI generation module based upon the parsed UI definition file (which defines which components to instantiate, when to instantiate them, and with which parameters) and the registry. In an embodiment, components may have inherent default parameters, default parameters per component as defined in the UI definition file (in its "defaults" section—see Table A above), and parameters defined on the concrete instantiation level as per the UI definition file (in its "components" section). The component parameters (as defined in the UI definition file and as defaults associated with UI components classes) inform dynamic HTML and CSS generation, which are a part of component instantiation. They also inform the configuration of JavaScript objects representing components within the component framework. In an embodiment, this UI component framework provides raw (not-yet-configured) components and manages the life-cycle (and, implied visibility) of components. In some embodiments, a deployment platform is any web-based rendering application, and in an embodiment a deployment platform is HTML5 and thus supports any device that can run HTML5, including but not limited to smartphones, tablets, and traditional computers.

Accordingly, embodiments of the invention permit the run-time construction of web application manifolds within the limits of a finite set of UI building blocks (i.e., components) and their associated finite set of configuration parameters, under control of a UI definition file.

FIG. 3 illustrates a block diagram of a system 300 including an IPTV system 306 utilizing dynamic runtime application generation based upon parameterized code according to an embodiment of the invention. The system 300 includes one or more content providers 310A-310M that provide video assets to the IPTV system 306 (or directly to UE devices 328), which are ultimately to be distributed/communicated with UE devices 328 (optionally at a user premise 308) via a communication network 304. The communication network 304 may include any type of data network, voice network, broadcast network, IP-based network, and/or wireless network facilitating communication of data and media content in any format. The communication network 304 can be implemented using any well-known type of network topology and/or communication protocol, and may be represented or otherwise implemented as a combination of two or more networks.

The UE devices 328 (or viewing systems, consumer devices, client devices, etc.) are electronic devices used by users 302A-302N to access video assets via an application 326A-326E providing access to the IPTV system 306. A non-exhaustive set of UE devices 328 are illustrated herein and include a Set Top Box (STB) 322 which is connected to a display 324A (commonly a television, but can also be another type of monitor, projector, etc.). Other UE devices 328 include a smart phone 330, a tablet 332, and a laptop or desktop computer 334—each of which may include a processor, computer-readable storage, a display 324B-324D, and optionally an application 326A-326E that executes to allow connectivity/interaction with the IPTV system 306. However, other UE devices can be implemented as any one or combination of wired and/or wireless device, as any form of television client device (e.g., STB 322, digital video recorder (DVR)), gaming device, computer device, portable computer device, consumer device, media device, communication device, video processing and/or rendering device, appliance device, mobile phone (e.g., cellular, Voice over IP (VoIP), Wi-Fi, etc.), a portable media device (e.g., a personal/portable media player, handheld media player, etc.), wearable device, and/or as any other type of device that is implemented to receive media content in any form of audio, video, and/or image data. A UE device (e.g., STB 333) may also be associated with a user 302A (i.e., a person) and/or an entity that operates the device.

The various UE devices (322, 330, 332, 334) shown in system 300 may or may not include a respective display device (e.g., 324A-324D). A UE device and display device together render and playback audio, video, and/or image data. A display device (e.g., display 324A) can be implemented as any type of a television, high definition television (HDTV), Liquid Crystal Display (LCD), Light-Emitting Diode (LED) display, or similar display system. The various client devices (e.g., television, gaming, or computer devices) may also be associated with one or more input devices, such as a remote control device for accepting user-selectable input and selections to the television client device, a gaming controller for user-selectable inputs to the gaming device, and/or a keyboard and/or mouse input devices for user-selectable input to the UE device. The UE devices described herein can also be implemented with any differing combinations of other components such as one or more processors, communication components (e.g., network interfaces), memory components, and/or processing and control circuits. For example, a UE device may include network interfaces to receive video assets from IPTV system 306 and/or content providers 310A-310M, interfaces to receive broadcast and/or over-the-air inputs via which video assets can be received over the air. The UE devices may also include one or more tuners to tune television channels and/or data streams for display and viewing.

The UE devices and/or displays may optionally include IPTV applications (or "apps") 326A-326E to assist in providing connectivity to the IPTV system 306. These IPTV apps 326, when executed by processors of the respective devices, may be configured to cause the respective devices to connect to the IPTV system 306 (e.g., using a set of network interfaces), send requests to the IPTV system 306 (e.g., for lists of video assets, for video assets themselves), receive responses from the IPTV system 306 (e.g., user interface (UI) elements from the IPTV system 306, video assets), present the user interfaces of the IPTV system 306 on the displays to the users, and/or display the video assets and any (optional) corresponding user interfaces (e.g., playback controls, additional video assets, advertising, etc.). In some embodiments of the invention, the applications 326A-326E are built using web-based technologies, including one or more of HTML code, CSS rules, JavaScript code, etc.

In the depicted embodiment of FIG. 3, the IPTV system 306 includes one or more computing devices 330 that include processor(s) 334, network interfaces 336 (for connecting to the content providers 310A-310M and/or social networking system 320 and/or UE devices 328), and computer-readable storage media 332. The computer-readable storage media 332, in some embodiments, may store copies of video assets, which may be provided by the content providers 310A-310M. The term "video asset" is generally used to refer to video or collection of images that may or may not include audio; however, the term "video asset" may also be used generically to refer to a piece of multimedia content, including but note limited to any type of audio, video, and/or image data received from any media content and/or data source. As described herein, a video asset can include recorded video content, video-on-demand (VOD) content, OTT video content, television content (e.g., "live" television, "broadcast" television), advertisements, commercials, music videos, movies, video clips, and other media content. Depending upon configuration, the IPTV system 306 may provide the video assets to the UE devices 328 via the network 304, but in some configurations the UE devices 328 use the network 304 to directly access video assets from content providers 310A-310M.

The computer-readable storage media 332 may also store other media content, metadata, interactive games, network-based applications, and/or any other content or data (e.g., program guide application data, user interface data, advertising content, closed captioning data, content metadata, search results and/or recommendations, etc.) for use by the IPTV system 306 and/or UE devices 328 when interacting with the IPTV system 306 and/or video assets.

In the depicted embodiment, the set of processors 334 of the one or more computing devices 330 executes a customized style module instance 340B, which may be launched using customized style module code 340A stored by the computer-readable storage media 332. The customized style module instance 340B is used as part of the system for dynamically generating applications through use of the augmented style code 342 and style generation code 344 stored by the computer-readable storage media 332. The augmented style code 342, in an embodiment includes portions of style rules following a style standard (e.g., CSS) that have been modified, or augmented, to include expressions including parameters. Thus, the augmented style code 342, in its entirety, will not strictly follow the style standard and thus will be deemed invalid according to that style standard. The customized style module instance 340B may translate the augmented style code 342 into the style generation code 344. In an embodiment, the style generation code 344 is executable code (either by the computing device(s) 330 or by the applications 326 executing on the UE device(s) 324) that can generate valid style rules 348 to be used by the applications 326. In some embodiments, this style generation code 344 comprises JavaScript code, but in other embodiments it can include any other computer-executable code (e.g., code written in Python, Lua, C++, C, ML, Fortran, PHP, Ruby, VBScript, Scheme, Shell scripts, XSLT, Tcl, Java, Smalltalk, Objective C, C#, Visual Basic, etc.).

In an embodiment, the style generation code 344 is executed through a set of style generation invocations 346, which may optionally exist (and be executed by) the computing device(s) 330 or directly by a UE device 324 at runtime. The set of style generation invocations 346, in an embodiment, causes the style generation code 344 to be executed using a set of input variables, which causes the custom generated set of style rules 348 to be generated. Examples of augmented style code 342, style generation code 344, style generation invocation code 346, and generated sets of valid style code 348 are now presented in further detail in FIG. 4, FIG. 5A, and FIG. 5B.

Figure 4:
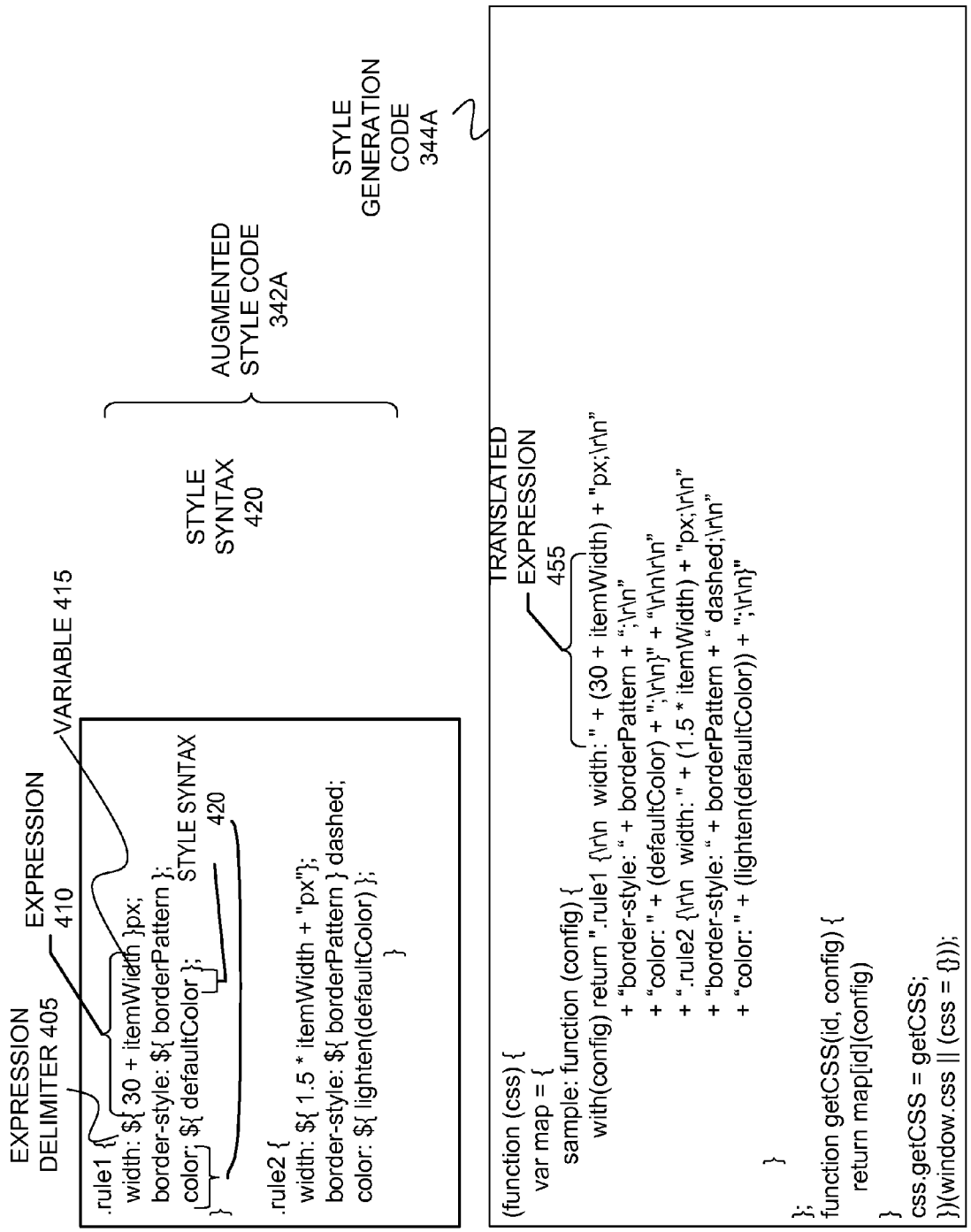
FIG. 4 illustrates augmented style code and style generation code according to an embodiment of the invention.

FIG. 4 illustrates augmented style code 342 and style generation code 344 according to an embodiment of the invention. The augmented style code 342 and style generation code 344 are used as part of the overall solution for providing dynamically generated applications; in particular, these pieces of the solution allow for dynamic styling of user interfaces of the application.

Accordingly, in an embodiment the augmented style code 342 comprises parameterized CSS files that can be used in deferred evaluable transformation system for high-performance, dynamic, run-time, parameterized finalization. The augmented style code 342, in an embodiment, is provided as one or more input files that include modified CSS rules that have been augmented with additional expression-based syntax. In some embodiments, the augmented style code 342 is generated by a technology provider and constructed purposefully to "expose" certain aspects of a UI to be modified through use of expressions 410 including variables 415.

In an embodiment, notably, the augmented style code 342 input files might themselves be the output of other CSS preprocessing software, such as the Less.js dynamic style sheet language.

As depicted in FIG. 4, the illustrated augmented style code 342A includes two rules—or style declarations—that each include style syntax 420 and expressions 410 (using variables 415) demarcated by expression delimiters 405. In this example, the expression delimiters 405 comprise an opening delimiter (comprising a dollar sign followed by an open curly bracket) and a closing delimiter (comprising a closing curly bracket), though in other embodiments other opening and closing delimiters may be used, provided that they can be unambiguously identified by a parser. In this example, a first rule (for objects having a class matching the selector of ".rule1") includes three declarations (or, "sub-rules"), where a "width" attribute has an associated value including an expression 410 defining the value to be a sum of an "itemWidth" variable added with the number thirty. A second declaration also includes an expression 410 indicating that the attribute "border-style" is to have an associated attribute value represented by the value of a variable named "borderPattern". Finally, the first rule also includes a third declaration indicating that a "color" attribute is to have an associated attribute value represented by the value of variable named "defaultColor". A second rule (for objects having a class matching the selector of ".rule2") is similar to the first rule, as it also includes three declarations for the "width", "border-style", and "color" attributes. However, the expressions 410 for the "width" and "color" are different—here, the attribute value for "width" is configured to represent 1.5 times the value of the itemWidth variable, and the attribute value for "color" is configured to be a result from an application of a "lighten( )" function using a variable "defaultColor" as its argument. This lighten( ) function may be a function that is part of a language of the later-generated style generation code 344A, defined by the technology provider, or made available in some other manner.

The format of the expressions 410 within the augmented code may be configured in a variety of ways—in an embodiment, the technology provider simply defines a grammar/syntax for these expressions 410 that will be recognized by a parser used to generate the style generation code 344A. However, in other embodiments the format of the expressions 410 follows a defined language grammar/syntax of a common programming language.

With the one or more files representing the augmented style code 342A, the customized style module instance 340B will parse and compile the augmented style code 342A into the style generation code 344A. In an embodiment, the style generation code 344A is JavaScript code that, when executed, injects CSS rules into an application loading (e.g., in a browser). In other embodiments, the style generation code 344A is code of another language that is configured to generate valid CSS when executed with proper input arguments for the translated expressions 455. In the depicted embodiment of FIG. 4, the style generation code 344A comprises a set of functions that accept a set of input variables/arguments for itemWidth, borderPattern, and defaultColor, and that returns a string of valid CSS based upon the values of those arguments. In an embodiment, the style generation code 344A is specifically designed to be fast. As an example, in some embodiments it does not include any explicit parsing. In some embodiments, the style generation code 344A is designed to execute within a particular type of application 326 (e.g., a web browser), designed to run on a server, or flexible to be run by either.

For example, in the depicted embodiment of FIG. 4, the generated style generation code 344A is valid JavaScript code, where each parameterized CSS file (i.e., the augmented style code 342A) is transformed into style generation code 344A comprising a JavaScript function that takes several parameters as its input, one of which is a map of values made available for use within that function, as defined in the input parameterized CSS file (e.g., augmented style code 342A). The generated style generation code 344A is designed for high performance, and includes primarily simple string concatenation operations, along with any additional operations expressed in the parameterized CSS. In some deployments, this first step is intended to happen infrequently, as an initial build step for the application to be deployed.

This approach, which includes using augmented style code 342A to generate style generation code 344A, provides several distinct advantages that center around flexibility and performance. This approach is flexible because it allows parameterized style rules (e.g., CSS rules) to be easily "finalized" into standard rules for multiple environments/configurations. Additionally, this approach is performant because this "two-step" approach performs the computationally expensive aspects in its first "translating the augmented style code 342A to generate the style generation code 344A" step, which leaves a "lighter" amount of computational expense (e.g., at runtime by a relatively less powerful UE device) in its second step of invoking the style generation code 344A while preserving the power and expressiveness of style parameterization.

The second step of the solution includes having the style generation code 344A deployed in an environment and ran as needed to obtain the desired level of customization. One implementation of that step can be to run it immediately after it is generated, as part of the same build process. This would be primarily useful in a situation where a finite number of parameters is known at build time, as matching style files (e.g., CSS files) can then be generated efficiently for each set of parameters. Thus, in some embodiments, the server end station (i.e., computing device(s) 330) may directly use the style generation code 344A to perform the "second step" to generate sets of valid style rules 348 by calling the style generation code 344A using a set of style generation invocations 346. For example, the computing device(s) 330, in the computer-readable storage media 332, may store a set of style generation invocations for each user and/or user interface and/or deployment scenario that needs to be generated for the application. Another implementation of this second step can be to deploy the generated style generation code 344A to web servers providing aspects of the application, and have those web servers "finalize" the style rules (e.g., CSS) based on a set of parameters that may vary with each request.

Yet another implementation of the second step can be to deploy the generated style generation code 344A as part of client-side JavaScript files that are served to browsers, and have this style finalization code run within each user's browser using parameters acquired by the client-side application. Thus, in some embodiments, the server end station (i.e., computing device(s) 330) may instead transmit the style generation code 344A (directly or indirectly through other computing devices and/or processes) to a UE device 328, which itself will generate sets of valid style rules 348 by calling the style generation code 344A using a set of style generation invocations 346. The set of style generation invocations 346 may be stored locally at the UE device 328, retrieved from the server end station, or retrieved from another computing device. In an embodiment, although the same version of the style generation code 344A may be transmitted to many different UE devices of potentially different users of potentially different service agreements (dictating what content is to be presented by the application), the set of style generation invocations 346 may be unique to each user, group of users, group of devices sharing a common characteristic, etc., to allow completely different applications to be generated.

In these embodiments of the invention, the separation of the parsing of the augmented style code 342 (e.g., parameterized CSS) from the generation of the final style rules (e.g., by invoking the style generation code 344A), is accomplished in a manner that enables that style generation to be fast, and to be able to be done in multiple environments, including in a browser where existing CSS pre-processor tools either do not support using the in such a fashion or are not practical due to the performance penalty that would come with using them in such a fashion.

FIG. 5A illustrates style generation invocation code 346A that, when used to invoke the style generation code 344A of FIG. 4, results in the illustrated set of valid style rules 348A and the customized user interface 525A being generated according to an embodiment of the invention. In this depicted embodiment, style generation invocation code 346A comprises code (e.g., JavaScript code such as jQuery code) with a plurality of input variables 525 corresponding to the variables/parameters of the style generation code 344A. The style generation invocation code 346A includes these input variables 525 that comprise an attribute 505 matching the variables of the translated expressions 455 of the style generation code 344A, and values 510 to be used as arguments to invoke the style generation code 344A to generate the set of valid style rules 348A. In this depicted example, the input arguments include values 510 of "50" for the attribute itemWidth, the value "solid" for the attribute border-style, and the value "#567A3C" for the attribute defaultColor. When invoked using these values, the style generation code 344A will generate the illustrated set of valid style rules 348A that are valid according to the style standard. As an example, the itemWidth of "50" is passed to the style generation code 344A, which causes the first class selector ".rule1" to have a value of "80 px" (based upon the translated expression 455 of "30+itemWidth" concatenated with "px"), and the second class selector ".rule2" to have a value of "75 px" (based upon the translated expression 455 of "1.5*itemWidth" concatenated with "px"). Similarly, the input argument values of border-style "solid" and defaultColor "#567A3C" cause the first class selector to have values of "solid" and "#567A3C" (just as passed in) and cause the second class selector to have values of "solid dashed" and "#6A8E50".

Accordingly, the invocation of the style generation code 344A, in this embodiment, causes the style rules to be applied to the customized UI 525A, which includes a first set of user identifiers 545A (e.g., users "logged in" or "detected to be using" the application), a set of hub selection UI elements 530 allowing the user(s) to perform functions in the application, and a first UI element 535A and second UI element 540A. For purposes of this illustration, first UI element 535A (e.g., a <div>, <span>, etc.) has a class of "rule1" and will be presented according to the first rule of the generated set of style rules 348A, and the second UI element 540A has a class of "rule2" and will be presented according to the second rule of the generated set of style rules 348A. In this example, the first UI element 535A has a longer horizontal length (80 px) compared to the second UI element 540A length (75 px), as dictated by the generated set of style rules 348A. Similarly, the "rule1" border-style of the generated set of style rules 348A causes the first UI element 535A to have four solid borders, and the "rule2" border-style of the generated set of style rules 348A causes the second UI element 535A to have a "solid" top and bottom border, and a "dashed" left and right side border. Additionally, the "rule1" color of the generated set of style rules 348A causes the first UI element 535A to have a dark green border, and the "rule2" color of the generated set of style rules 348A causes the second UI element 535A to have a comparatively lighter green border.

In a similar vein, FIG. 5B illustrates additional style generation invocation code 346B that, when used to invoke the style generation code 344A of FIG. 4, results in the illustrated additional set of valid style rules 348B and the additional customized user interface 525B being generated according to an embodiment of the invention. This additional style generation invocation code 346B may, for example, be used by another user (e.g., represented by the second user identifier 545B) of the same application or another device of the same (or a different) user to generate a (different) customized UI 525B. In this depicted example, style generation invocation code 346B instead includes an itemWidth of "70", a border-style of "dotted", and a defaultColor of "#333333". By invoking the style generation code 344A with these parameters, the generated set of valid style rules 348B will be different than the generated set of valid style rules 348A despite both resulting from the use of the same style generation code 344A. Thus, in this example, the first UI element 535B will now be shorter than the second UI element 540B, have four dotted, dark gray borders. Similarly, the second UI element 540B will now be longer than the first UI element 535B, have a light gray dotted top and bottom border and light gray dashed right and left borders.

Figure 6:
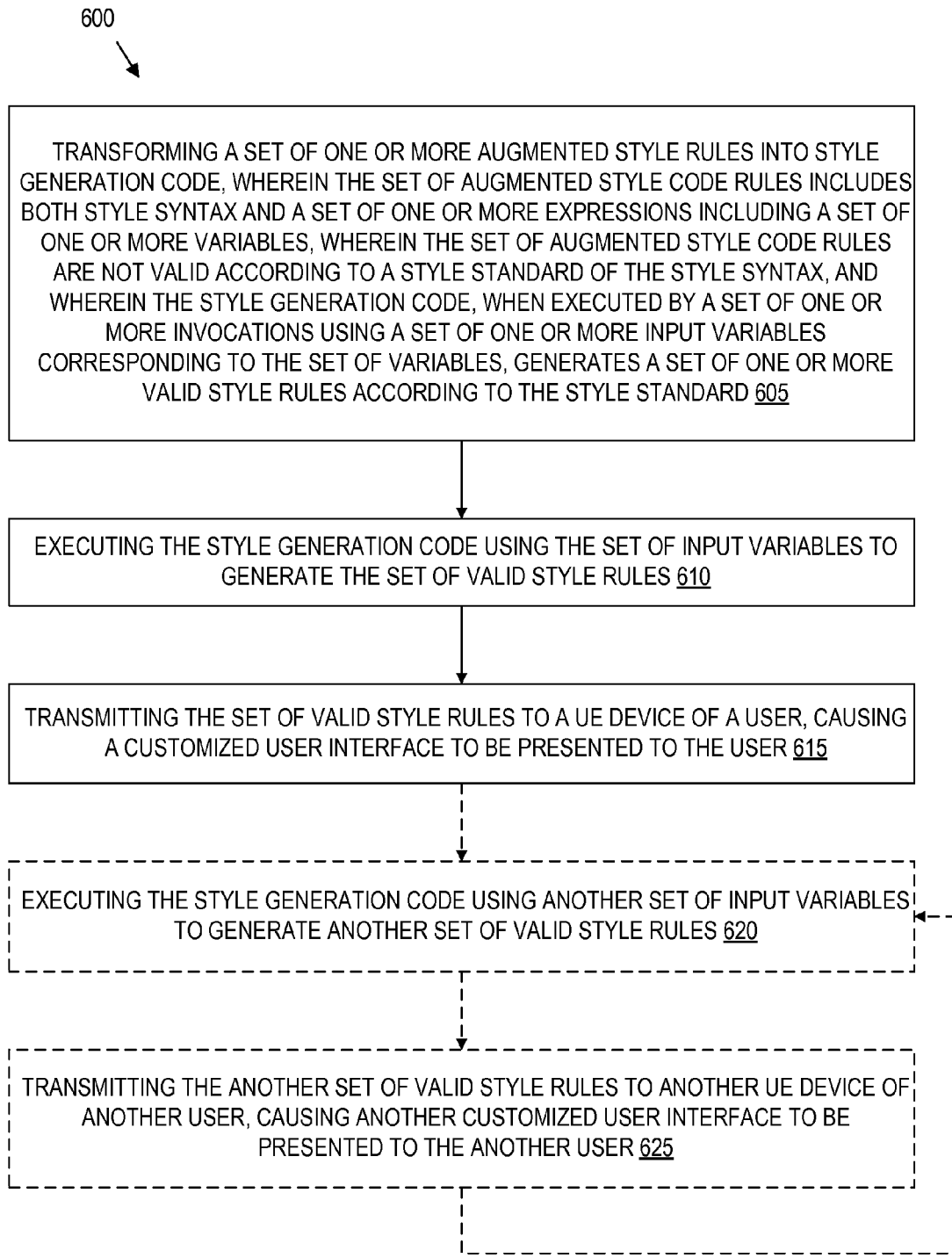
FIG. 6 illustrates a flow in a server end station for utilizing parameterized style rules to allow for the dynamic runtime generation of user interfaces of an application according to embodiments of the invention.

FIG. 6 illustrates a flow 600 in a server end station (e.g., computing device(s) 330) for utilizing parameterized style rules (i.e., augmented style code 342A) to allow for the dynamic runtime generation of user interfaces of an application according to embodiments of the invention.

The flow 600 includes, at block 605, transforming a set of one or more augmented style rules into style generation code. The set of augmented style code rules includes both style syntax (e.g., portions of CSS rules) and a set of one or more expressions including a set of one or more variables. However, the set of augmented style code rules are not valid according to a style standard (e.g., CSS) of the style syntax. This style generation code, when executed by a set of one or more invocations using a set of one or more input variables corresponding to the set of variables, generates a set of one or more valid style rules according to the style standard.

The flow also includes, at block 610, executing the style generation code using the set of input variables to generate the set of valid style rules. In an embodiment, the set of input variables are part of the set of invocations, which may be code written in a common language with the style generation code. In an embodiment, the common language is JavaScript, and in an embodiment the set of valid style rules are CSS rules.

At block 615, the flow further includes transmitting the set of valid style rules to a UE device of a user, causing a customized user interface to be presented to the user. In an embodiment, the set of valid style rules are part of a CSS file, which is rendered by a browser application executing on the UE device.

Optionally, the flow continues one or more times by executing the style generation code using another set of input variables to generate another set of valid style rules (at block 620) and transmitting the another set of valid style rules to another UE device of another user, which causes another customized user interface to be presented to the another user (at block 625). Blocks 620 and 625 may optionally be executed one or more times, to easily and efficiently provide customized user interfaces for different users of the application/system. In an embodiment the user interfaces are of an IPTV application to allow the users to access content provided by an IPTV system.

As described above, the style generation code may be executed in a variety of locations by a variety of different devices. For example, the style generation code may be executed at a UE device.

FIG. 7 illustrates a flow 700 in a server end station (e.g., computing device(s) 330) for utilizing parameterized style rules (i.e., augmented style code 342A) to allow for the dynamic runtime generation of user interfaces of an application according to embodiments of the invention. The operations of FIG. 7 is similar to the operations of FIG. 6 with the exception that the server end station transmits the style generation code to a UE device which is then configured to execute the style generation code.

The flow 700 includes, at block 705, transforming a set of one or more augmented style rules into style generation code. The set of augmented style code rules includes both style syntax (e.g., portions of CSS rules) and a set of one or more expressions including a set of one or more variables. However, the set of augmented style code rules are not valid according to a style standard (e.g., CSS) of the style syntax. This style generation code, when executed by a set of one or more invocations using a set of one or more input variables corresponding to the set of variables, generates a set of one or more valid style rules according to the style standard. The flow also includes, at block 710, transmitting the style generation code to a UE device of a user.

Figure 8:
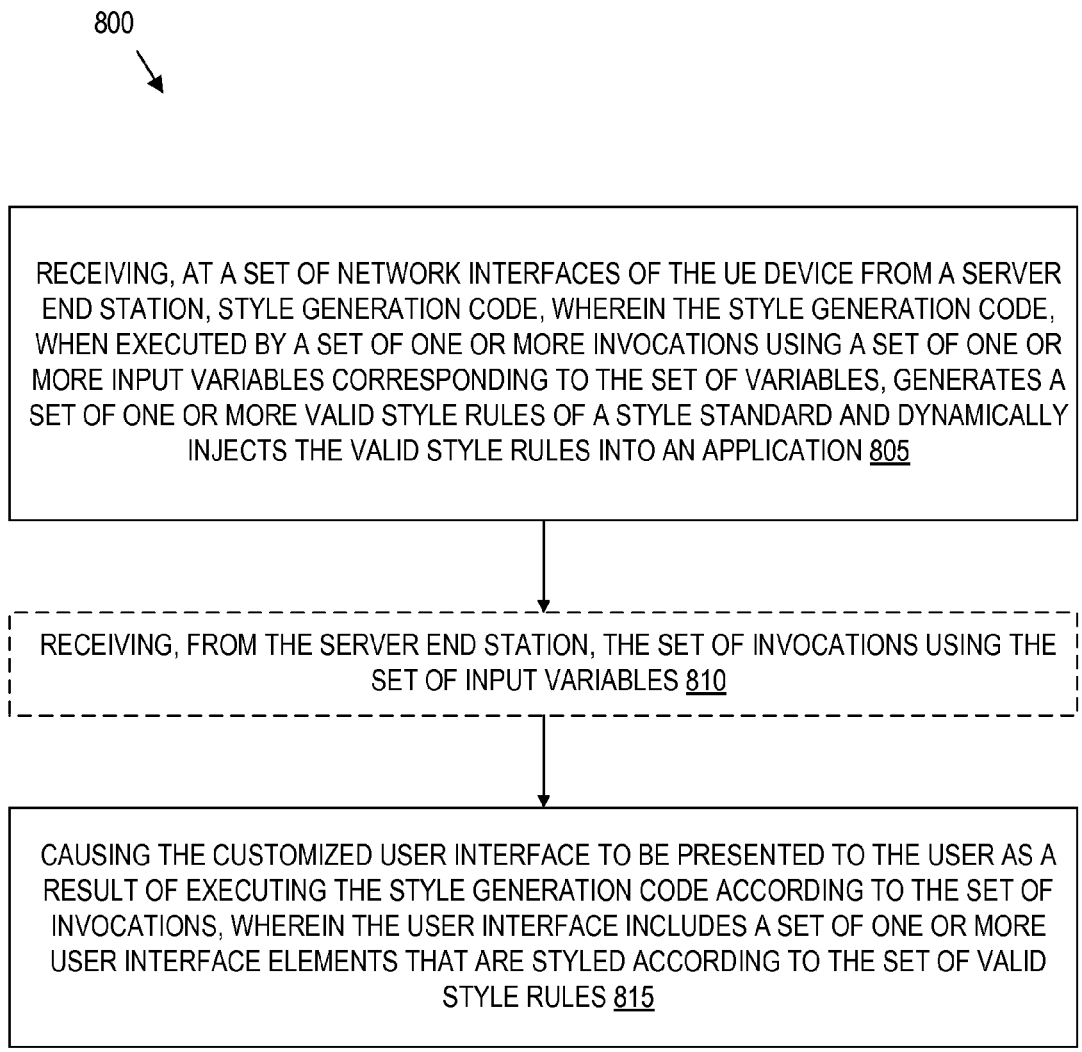
FIG. 8 illustrates a flow in a user equipment device for utilizing style generation code generated by a server end station for dynamic runtime generation of user interfaces of an application according to embodiments of the invention.

FIG. 8 illustrates a flow 800 in a user equipment device for utilizing style generation code generated by a server end station for dynamic runtime generation of user interfaces of an application according to embodiments of the invention. Flow 800 includes, at block 805, receiving, at a set of network interfaces of the UE device from a server end station, style generation code. The style generation code, when executed by a set of one or more invocations using a set of one or more input variables corresponding to the set of variables, generates a set of one or more valid style rules of a style standard and dynamically injects the valid style rules into an application. In an embodiment, the style rules are CSS rules, and in various embodiments the application may be a web application executing in a browser or a special-purpose application.

Optionally, the flow 800 includes at block 810 receiving, from the server end station, the set of invocations using the set of input variables. In other embodiments, though, the set of invocations are created at the UE device (e.g., providing a user interface to solicit the arguments/values for the invocations) or retrieved from a different server end station or different UE device.

At block 815, the flow further includes causing the customized user interface to be presented to the user as a result of executing the style generation code according to the set of invocations. The user interface includes a set of one or more user interface elements that are styled according to the set of valid style rules.

Although FIGS. 4-8 focus upon the dynamic generation of style rules, embodiments of the invention are also able to dynamically create other portions of an application, including but not limited to components and behaviors, using similar systems. While embodiments have been described in relation to an IPTV system, alternative embodiments could instead be utilized for other systems using customizable applications. For example, embodiments of the invention work in nearly any type of web application/site that can benefit from providing customized "views" into an application that reveal different interfaces, styles, functions, components, and/or behaviors.

While embodiments disclosed herein describe CSS as being used as a style standard and style sheet language, the scope of the invention is not to be limited to using CSS as the only style sheet language as other style sheet languages may be used.

Additionally, while many embodiments disclosed herein focus upon the parameterization of style rules (e.g., CSS), the scope of the invention is not to be so limited. Instead, in various embodiments of the invention, other types of computer code can be parameterized in this manner, including but not limited to structural and/or behavioral component code (e.g., JavaScript), display code (e.g., HTML), and nearly any other type of code that can form portions of an application, whether it be a web application or other type of application.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a user equipment (UE) device for programmatic runtime generation of an application, comprising:
receiving a single user interface (UI) definition file, wherein the UI definition file includes a plurality of definitions indicating visual appearance attributes of portions of the application, a set of one or more components that are UI building blocks to be presented within the application, and a set of behaviors that may be performed by the components, wherein the plurality of definitions includes a plurality of attribute-value pairs;
receiving a set of one or more component definition files that include code for implementing a plurality of components that includes the set of components indicated by the UI definition file, wherein the UI definition file is distinct from the set of one or more component definition files;
after a beginning of an execution of the application, parsing the UI definition file to identify the visual appearance attributes, the set of components, and the set of behaviors; and
dynamically instantiating the set of components based upon the parsed UI definition file and the set of component definition files to create the application.

2. The method of claim 1, wherein the UI definition file is received from a server end station.

3. The method of claim 2, wherein the UI definition file is received at the beginning of the execution of the application.

4. The method of claim 3, further comprising transmitting, to the server end station, an XMLHttpRequest for the UI definition file.

5. The method of claim 2, wherein the UI definition file is received within a package providing the application.

6. The method of claim 1, wherein the dynamically instantiating comprises calling a set of one or more script language functions using one or more sets of parameters from the UI definition file.

7. The method of claim 6, wherein the set of script language functions dynamically creates UI elements representing the set of components.

8. The method of claim 6, wherein the set of script language functions are JavaScript functions.

9. A non-transitory computer-readable storage medium storing instructions which, when executed by a set of one or more processors of a computing device, cause the computing device to programmatically generate an application at runtime by performing operations comprising:
receiving a single user interface (UI) definition file, wherein the UI definition file includes a plurality of definitions indicating visual appearance attributes of portions of the application, a set of one or more components that are UI building blocks to be presented within the application, and a set of behaviors that may be performed by the components, wherein the plurality of definitions includes a plurality of attribute-value pairs;
receiving a set of one or more component definition files that include code for implementing a plurality of components that includes the set of components indicated by the UI definition file, wherein the UI definition file is distinct from the set of one or more component definition files;
after a beginning of an execution of the application, parsing the UI definition file to identify the visual appearance attributes, the set of components, and the set of behaviors; and
dynamically instantiating the set of components based upon the parsed UI definition file and the set of component definition files to create the application.

10. The non-transitory computer-readable storage medium of claim 9, wherein the UI definition file is received from a server end station.

11. The non-transitory computer-readable storage medium of claim 10, wherein the UI definition file is received at the beginning of the execution of the application.

12. The non-transitory computer-readable storage medium of claim 11, wherein the operations further comprise:
transmitting, to the server end station, an XMLHttpRequest for the UI definition file.

13. The non-transitory computer-readable storage medium of claim 10, wherein the UI definition file is received within a package providing the application.

14. The non-transitory computer-readable storage medium of claim 9, wherein the dynamically instantiating comprises calling a set of one or more script language functions using one or more sets of parameters from the UI definition file.

15. The non-transitory computer-readable storage medium of claim 14, wherein the set of script language functions dynamically creates UI elements representing the set of components.

16. The non-transitory computer-readable storage medium of claim 14, wherein the set of script language functions are JavaScript functions.

* * * * *